(12) United States Patent
Velusamy et al.

(10) Patent No.: US 10,292,057 B2
(45) Date of Patent: May 14, 2019

(54) NETWORK IDENTIFICATION AND DISPLAY BASED ON LOCAL INFORMATION

(75) Inventors: Senthil Kumar Mulluppadi Velusamy, Bellevue, WA (US); Uday Reddy Dodla, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 613 days.

(21) Appl. No.: 13/021,642

(22) Filed: Feb. 4, 2011

(65) Prior Publication Data
US 2012/0201232 A1 Aug. 9, 2012

(51) Int. Cl.
*H04W 24/02* (2009.01)
*H04L 5/00* (2006.01)
*H04W 48/16* (2009.01)

(52) U.S. Cl.
CPC .......... *H04W 24/02* (2013.01); *H04L 5/0091* (2013.01); *H04W 48/16* (2013.01)

(58) Field of Classification Search
CPC ...... H04L 5/0091; H04W 24/02; H04W 48/16
USPC ................................. 370/338; 455/436, 455
See application file for complete search history.

(56) References Cited

U.S. PATENT DOCUMENTS

| | | | |
|---|---|---|---|
| 6,600,728 B1 | 7/2003 | Choi | |
| 6,751,484 B1 | 6/2004 | Sandelius et al. | |
| 7,142,526 B1* | 11/2006 | Hokao | H04W 48/20 370/331 |
| 7,233,650 B1* | 6/2007 | Canny | 379/142.01 |
| 7,756,485 B2 | 7/2010 | Paas et al. | |
| 7,929,970 B1* | 4/2011 | Gunasekara | H04W 36/04 455/437 |
| 8,649,791 B1* | 2/2014 | Wohld | H04W 36/0083 455/446 |
| 2004/0253947 A1* | 12/2004 | Phillips | H04W 48/18 455/422.1 |
| 2005/0113088 A1* | 5/2005 | Zinn | H04W 8/183 455/435.2 |
| 2005/0114496 A1 | 5/2005 | Fang et al. | |
| 2005/0202828 A1* | 9/2005 | Pecen | H04W 36/0055 455/453 |
| 2006/0178145 A1* | 8/2006 | Floam | H04W 24/00 455/434 |
| 2007/0275717 A1* | 11/2007 | Edge | H04W 48/16 455/434 |
| 2008/0032715 A1* | 2/2008 | Jia | H04W 68/12 455/458 |
| 2009/0036123 A1* | 2/2009 | Jeon | H04W 48/16 455/434 |
| 2009/0042575 A1* | 2/2009 | Voyer et al. | 455/436 |
| 2009/0054065 A1* | 2/2009 | Voyer et al. | 455/436 |

(Continued)

*Primary Examiner* — Khaled M Kassim
(74) *Attorney, Agent, or Firm* — Lee & Hayes, P.C.

(57) ABSTRACT

A telecommunication device configured to build a list of cells of a telecommunication network that are associated with a specific network type is described herein. The list of cells may be stored locally on the telecommunication device. Also, the telecommunication device may be configured to determine that the cells are associated with the specific network type based on a data connection and to continue displaying an indicator associated with the specific network type despite interruption or completion of the data connection. Additionally, the list of cells may be built by a cloud service and provided to the telecommunication device.

19 Claims, 7 Drawing Sheets

(56) References Cited

U.S. PATENT DOCUMENTS

| | | | |
|---|---|---|---|
| 2009/0163229 A1 | 6/2009 | Bajpai et al. | |
| 2009/0225683 A1 | 9/2009 | Collins et al. | |
| 2009/0227226 A1 | 9/2009 | Gupta et al. | |
| 2009/0258668 A1* | 10/2009 | Kumar et al. | 455/552.1 |
| 2010/0178912 A1* | 7/2010 | Gunnarsson | H04W 24/02 455/423 |
| 2010/0240369 A1* | 9/2010 | Law | H04W 36/30 455/436 |
| 2010/0322396 A1* | 12/2010 | Southerland | H04M 1/575 379/88.19 |
| 2010/0330989 A1* | 12/2010 | Song | H04W 48/16 455/434 |
| 2011/0051658 A1* | 3/2011 | Jin | G01S 19/48 370/328 |
| 2011/0151886 A1* | 6/2011 | Grayson | H04W 16/04 455/452.1 |
| 2011/0176456 A1* | 7/2011 | Tamura | 370/254 |
| 2011/0182221 A1* | 7/2011 | Arakawa | H04B 1/3805 370/311 |
| 2011/0195713 A1* | 8/2011 | Ramasamy | H04W 48/16 455/434 |
| 2011/0237269 A1* | 9/2011 | Chen | H04W 36/0088 455/450 |
| 2011/0263252 A1* | 10/2011 | Saini | H04W 48/16 455/434 |
| 2012/0039284 A1* | 2/2012 | Barbieri | H04W 48/10 370/329 |
| 2012/0167207 A1* | 6/2012 | Beckley | H04W 4/001 726/22 |
| 2013/0225192 A1* | 8/2013 | Yamamoto | H04W 16/16 455/452.1 |

\* cited by examiner

FIG. 1

| List of Cells 112 | | |
|---|---|---|
| Cell ID 202 | Timestamp 204 | Num. Visits 206 |
| A | 1/18/2011, 21:02 | 5 |
| B | 12/23/2011, 06:35 | 12 |
| . . . | . . . | . . . |
| N | 1/11/2011, 13:48 | 2 |

NETWORK IDENTIFICATION AND DISPLAY BASED ON LOCAL INFORMATION

BACKGROUND

Recent years have witnessed rapid advances in telecommunications. Networks have evolved from analog to digital, from voice to multi-media, and from early protocols to Internet Protocol (IP) based telephony. At the same time, these networks have rapidly grown in speed, making data communication using telecommunication devices easier and more desirable. These networks are often referred to as first generation (1G), second generation (2G), third generation (3G), or fourth generation (4G). Example 2G networks include the Global System for Mobile Communications (GSM). Example transitional networks (dubbed "2.5G" and "2.75G") include General Packet Radio Service (GPRS) networks and Enhanced Data Rates for GSM Evolution (EDGE) networks. Example 3G networks include Universal Mobile Telecommunication System (UMTS) networks and CDMA2000 networks. Example 4G networks include High Speed Packet Access (HSPA) networks, Evolved HSPA (HSPA+) networks, Mobile Wi-Max networks, and Long Term Evolution (LTE) networks.

Often, telecommunication devices provide users with indicators of the type of network they are currently connected to. For example, a telecommunication device may display "3G" when connected to a 3G network, "E" when connected to an EDGE network, etc. These networks may change as a user moves from one cell of a telecommunication network to another, and even within the same cell as the telecommunication device begins or ends a specific connection type, such as a data connection. The changes of networks cause changes of the indicators displayed. Rapid changes of these indicators, especially when within a same cell, can be quite frustrating to users. Determining the current network type in order to enable display of the indicator can also consume valuable device resources, such as power and processing.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for building a list of cells of a telecommunication network that are associated with a specific network type and utilizing that list to present at least one indicator associated with the specific network type. A telecommunication device may be configured to determine that a current cell of the telecommunication network is associated with the specific network type and to include an identifier of the current cell in the list or, if the identifier is already present, update a timestamp associated with the identifier. In some implementations, the list may be initially provided to the telecommunication device by a telecommunication network service provider or a cloud service and may be persistently stored in local storage of the telecommunication device across multiple power cycles. Also, the telecommunication device can determine that the current cell is associated with the specific network type in a number of ways. First, the telecommunication device may form a data connection and receive information during the data connection which indicates that the cell is associated with the specific network type. Second, the telecommunication device may check the list of cells and, observing that the current cell is already included in the list, determine that the cell is associated with the specific network type. Third, the telecommunication device may receive an indication from the base station of the current cell of one or more network types the cell is associated with. Further, in various implementations, the specific network type may be one of a first generation network, a second generation network, a third generation network, a fourth generation network, a later generation network, a Wi-Fi network, or a Wi-Max network.

In addition to building the list, the telecommunication device may present at least one indicator associated with the specific network type. In some implementations, the telecommunication device may continue to present the at least one indicator while the telecommunication device remains in the current cell despite any interruption or completion of a data connection that was used to determine that the current cell is associated with the specific network type. Upon leaving the cell, the telecommunication device may update the presentation of the at least one indicator and may present at least one indicator associated with a network type of a new cell.

In various embodiments, the list of cells may initially be built by a cloud service. The cloud service may receive cell identifiers associated with the specific network type from a plurality of telecommunication device, may receive input from a telecommunication service provider, and may receive locations of one or more telecommunication devices. Based on these inputs, the cloud service may generate a common list of cells for multiple telecommunication devices or may generate a list of cells specific to a telecommunication device based at least on the location of that telecommunication device. The cloud service may then provide the list(s) to the telecommunication devices(s) for use by those telecommunication device(s).

Example Environment

Figure 1:
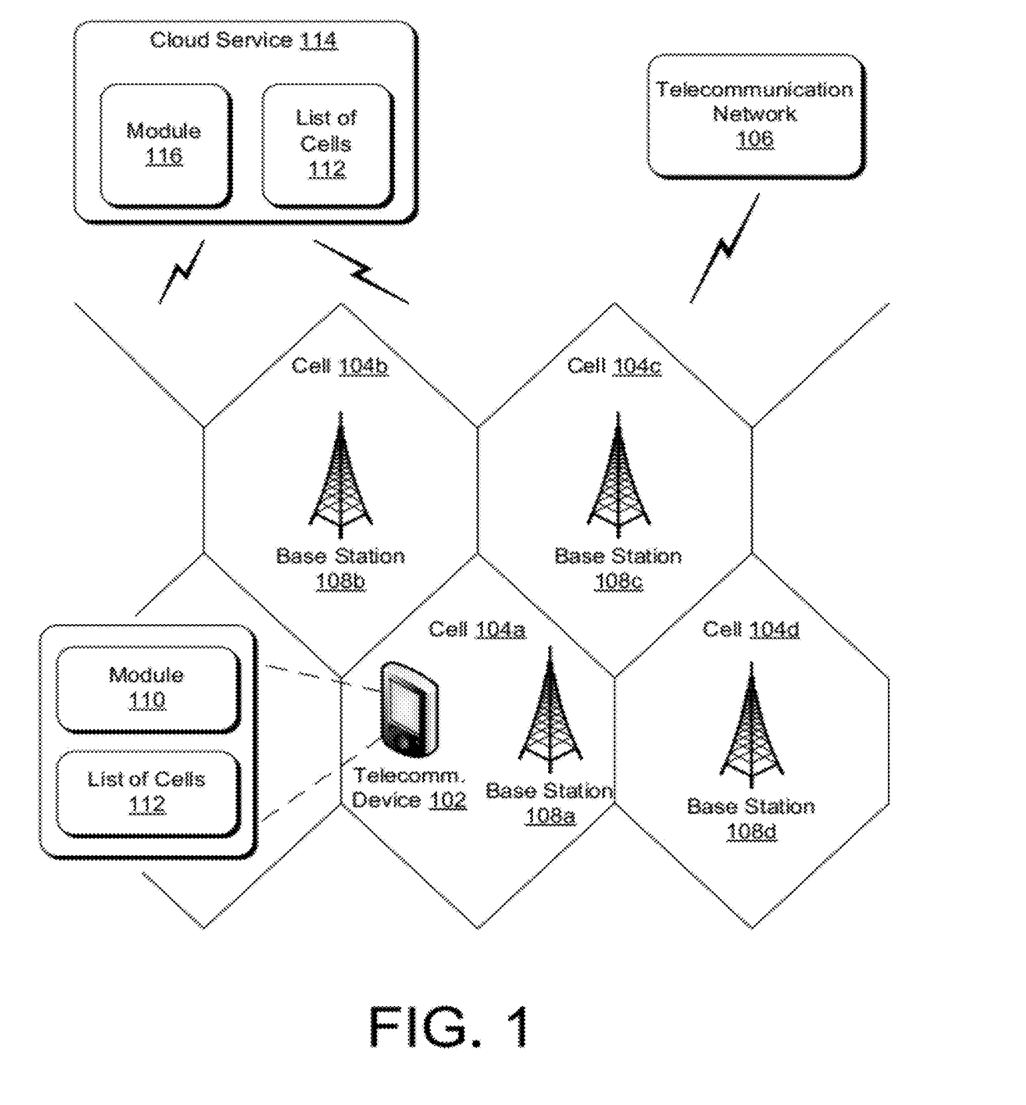
FIG. 1 illustrates an example environment, in accordance with various embodiments.

FIG. 1 illustrates an example environment, in accordance with various embodiments. As shown in FIG. 1, a telecommunication device 102 located in one of a plurality of cells 104 of a telecommunication network 106 may communicate with the telecommunication network 106 by connecting to a base station 108 of a cell 104 in which the telecommunication device 102 is located. The telecommunication device 102 may also include a module 110 that is capable of determining whether a current cell 104 is associated with a specific network type, of building a list of cells 112 which includes cells 104 that are associated with the specific network type, and presenting at least one indicator associated with a network type, among other operations. Additionally, the telecommunication device 102 may store the list of cells 112 in local storage. The list of cells 112 may be initially generated and provided by a cloud service 114, in some implementations, by a module 116 of the cloud service 114.

In various embodiments, the telecommunication device 102 may be any sort of telecommunication device, such as a smart phone, a cellular phone, a personal digital assistant (PDA), a personal computer (PC), a laptop, a desktop, a workstation, a media player, a gaming device, a television, a media center, or the like. An example telecommunication device 102 is illustrated in greater detail in FIG. 6 and is described in detail below with reference to that figure.

In some embodiments, the telecommunication device 102 may be located in a single cell 104, such as cell 104*a*, or may travel between cells 104. For example, if a telecommunication device user is driving, the telecommunication device 102 may travel from cell 104*a* to cell 104*d*. These cells 104, such as cells 104*a*, 104*b*, 104*c*, and 104*d* may each correspond to a land area and may have any sort of shape, such as a circular or elliptical shape. The hexagonal cell shapes in FIG. 1 are shown in that manner merely for the sake of illustrating the numerous forms cells 104 may take. Cells 104 may overlap each other such that a geographic location may be associated with multiple cells 104 or may be non-contiguous such that a geographic location might not be associated with any cell. Each cell 104 may be associated with a single base station 108. Each base station 108 may in turn offer one or more air interface technologies, such as GSM, UMTS, or CDMA2000 offering connections to GSM, UMTS, or CDMA2000 networks. Thus, a cell 104 may have a single base station 108 offering multiple network types through multiple air interface technologies, or may have a single base station 108 offering a single network type through a single air interface technology. Different network types offered by the base stations 108 may include 1G networks, 2G networks, 3G networks, 4G networks, later generation networks, Wi-Fi networks, or Wi-Max networks, among others. For example, cell 104*a* may include a base station 108*a* that offers 3G and 4G networks, cells 104*b* and 104*c* may include base stations 108*b* and 108*c*, respectively, that offer 3G networks, and cell 104*d* may include a base station 108*d* that offers 2G, 3G, and 4G networks.

In various embodiments, one or more of the base stations 108 may each be configured to broadcast or otherwise communicate the networks offered by that base station 108. The broadcast or communication may be received by telecommunication devices 102 within the cell 104 having that base station and may either convey an identifier associated with the network types offered (e.g., "4G") or information that may be utilized by the telecommunication device to determine the network types offered (e.g., an indication that the cell 104 is "64 QAM enabled", is "dual-carrier 64 QAM enabled", is "multi-carrier", or is "64 QAM enabled with multiple-input and multiple-output (MIMO)"). The identifier or information may be conveyed in a message header, in an extended header of a message, or in a message body. The location of the identifier or information in the message may be specified, for instance, by a standard or protocol. The base station(s) 108 may be configured with the one or more networks that they offer by a device of the telecommunication network 106 or by an operator associated with the service provider of the telecommunication network 106. An example base station 108 is illustrated in greater detail in FIG. 7 and is described in detail below with reference to that figure.

In some embodiments, the telecommunication network 106 comprises a network of a telecommunication service provider that offers a plurality of telecommunication services to telecommunication devices 102, such as voice calling, text or multi-media messaging, email, and data browsing, among many others. The telecommunication network 106 may include a plurality of computing device connected, for example, by one or more Wide-Area Networks (WAN), one or more local area networks (LAN), and/or one or more personal area networks (PAN). Communication between these computing devices of the telecommunication network 106 may be wired, wireless, or both. This communication may utilize any sort of communication protocol known in the art for sending and receiving messages, such as the Transmission Control Protocol/Internet Protocol (TCP/IP), the Hypertext Transfer Protocol (HTTP), Extensible Messaging and Presence Protocol (XMPP), and/or the Session Initiation Protocol (SIP). Any one or more of these protocols may also be used to communicate with telecommunication devices 102 through base stations 108 of the telecommunication network cells 104 and to further communicate with one or more other networks, such as WANs, LANs, PANs, or the Internet.

In various embodiments, the module 110 of the telecommunication device 102 may be any one or more functions, data structures, threads, processes, or applications and may form a part of a platform of the telecommunication device 102. The module 110 may manage operations such as determining network types of cells 104, building the list of cells 112, and initiating or completing presentation of at least one network type indicator, among other operations.

In some embodiments, the module 110 may receive an initial list of cells 112. The module 110 may receive the initial list 112 from a cloud service 114 or from the telecommunication network 106. The module 110 may receive the list of cells 112 responsive to sending a request for the list of cells 112 or may receive the list of cells 112 during an initial or subsequent connection to the telecommunication network 106 or the cloud service 114. Upon receiving the list of cells 112, the module 110 stores the list of cells 112 in local storage of the telecommunication device 102, such as a non-volatile memory to enable persistent storage across multiple power cycles of the telecommunication device 102.

Upon entering a cell 104 and initially communicating with a base station 108 of the entered cell, the module 110 may receive a cell identifier from the base station 108. Upon receiving the cell identifier, the module 110 checks the list of cell 112 to determine if the cell identifier is present in the list of cells 112. In some embodiments, the list of cells 112 includes a timestamp associated with each cell identifier, and the module 110 updates the timestamp for the entered cell with the current time. Also, in same or different embodiments, the list of cells 112 includes a number of visits associated with each cell identifier, and the module 110 updates the number of visits for the entered cell by incrementing the number.

The module 110 may also be configured to establish a data connection to a base station 108 upon entering a cell 104. Or, in other embodiments, rather than establishing the data connection, the module 110 may simply monitor the data connections established by other modules of the telecommunication device 102 and monitor the information exchanged during those data connections. This establishing or monitoring may be performed conditionally when there is no list of cells 112 stored in memory of the telecommunication device 102 or when the cell identifier of the entered cell is not present in the list of cells 112. Whether establishing or monitoring, the module 110 may note the receiving of information indicative of a specific network type from the base stations 108. For example, in the exchange of packet data protocol (PDP) context messages, the base station 108 may include in the PDP context response an indication that the current cell 104 is 64 QAM enabled, is dual-carrier 64 QAM enabled, is multi-carrier, or is 64 QAM enabled with MIMO. The module 110 may determine that "64 QAM enabled", "dual-carrier 64 QAM enabled", "multi-carrier", or "64 QAM enabled with MIMO" is associated with a specific network type, such as the specific network type associated with the list of cells 112. For example, the specific network type may be a 4G network and the current cell 104 being 64 QAM enabled, dual-carrier 64 QAM enabled, multi-carrier, or 64 QAM enabled with MIMO may indicate that the current cell is associated with 4G network connectivity and speeds. In embodiments where the module 110 established a data connection for the purposes of receiving the information indicative of the network type, the module 110 may complete the data connection as soon as the information is received, and may repeat the establishing, determining, and completing each time a new cell 104 is entered.

In other embodiments, rather than or in addition to establishing or monitoring data connections, the module 110 may receive a broadcast or communication from a base station 108 of a current cell 104 of one or more network types offered by the base station 108. The broadcast or communication may include identification of network types recognized by the module 110 (e.g., a field having "4G," etc. as a value) or information that the module 110 determines to be associated with network types (e.g., a field having "64 QAM enabled", "dual-carrier 64 QAM enabled", "multi-carrier", or "64 QAM enabled with MIMO" as a value). Upon receiving the identification or information, the module 110 may determine if the identification or information is associated with the specific network type.

As described above then, the module 110 may determine whether the current cell is associated with a specific network type by checking for the cell identifier of the current cell in the list of cells 112, by determining based on information received in a data connection that the current cell is associated with the specific network type, or by receiving a broadcast or communication of offered network type(s). In some embodiments, the module 110 may be programmed with the specific network type that the module 110 is to check for or may receive the specific network type from the telecommunication network 106 or cloud service 114.

In various embodiments, when the module 110 determines that the current cell is associated with the specific network type and that an identifier of the current cell is not present in a list of cells 112, the module 110 may add the identifier of the current cell in the list of cells 112. If no list of cells 112 exists, the module 110 may generate a list of cells 112, store the list of cells in local, non-volatile storage, and add the identifier of the current cell in the list of cells 112. Also, as mentioned above, the list of cells 112 may include timestamps or numbers of visits associated with cell identifiers. In such embodiments, the module 110 may set a timestamp to a current time and/or a number of visits to "1" when adding an identifier of the current cell to the list of cells 112.

In addition to building the list of cells 112, the module 110 may also determine when and whether to present at least one indicator associated with the specific network type. In some embodiments, upon determining that the current cell is associated with the specific network type, the module 110 may cause the presentation of at least one indicator associated with the specific network type. Presenting at least one indicator may include performing at least one of displaying the indicator, providing an audible signal, and/or providing a haptic signal. For example, if the specific network type is "4G network," the module 110 may cause the display of "4G" on some part of a display surface of the telecommunication device 102 by, for example, communicating with a graphics engine or component of the telecommunication device 102. The module 110 may also provide an audible signal, such as speaking "4G" or making a noise associated with that specific network type. The module 110 may further provide a haptic signal, such as a vibration. The telecommunication device 102 may then continue to present the at least one indicator while the telecommunication device 102 remains in the current cell. When the telecommunication device 102 enters a different cell, the module 110 may perform the operations described above to determine if the different cell is associated with the specific network type. If it is not, the module 110 may cause the telecommunication device to update the presentation of the at least one indicator to reflect a network type of a new cell. If the new cell is associated with the specific network type, then the telecommunication device 102 continues to present the at least one indicator. In one embodiment, the telecommunication device 102 updates presentation of the at least one indicator to present a different indicator associated with a different network type (e.g., "3G" for a 3G network, "E" for and EDGE network, etc.). Also, in embodiments where the module 110 determined that the cell 104 is associated with the specific network type based on a data connection, the telecommunication device 102 may continue presentation of the at least one indicator associated with the specific network type despite an interruption or completion of the data connection.

In some embodiments, the module 110 may also delete entries from the list of cells 112 either periodically or when adding/including a new cell in the list of cells 112. The list of cells 112 may be associated with a maximum size, which may be related to a memory capacity of the telecommunication device 102. When deleting entries, the module 110 may delete a cell identifier and its associated timestamp and number of visits. The module 110 may delete an entry for a cell having the oldest timestamp, a smallest number of visits, or both an oldest timestamp and a smallest number of visits. In one embodiment, the module 110 may be configured to not delete an entry having the greatest number of visits, regardless of whether that entry has the oldest timestamp.

Figure 2:
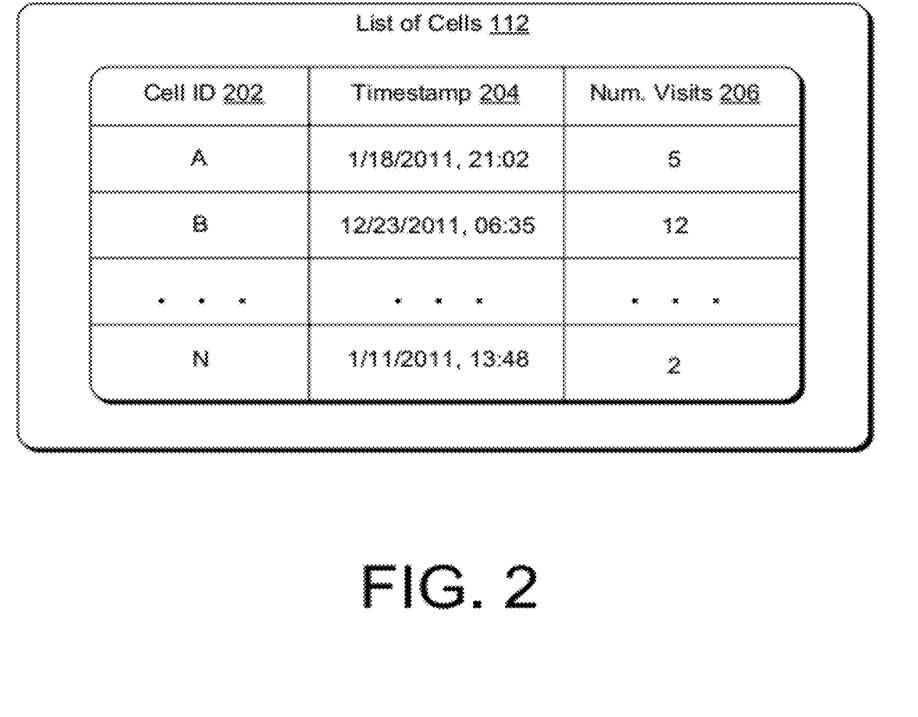
FIG. 2 illustrates an example list of cells, in accordance with various embodiments.

As shown in FIG. 1 and mentioned above, the telecommunication device 102 may persistently store the list of cells 112 across multiple power cycles in non-volatile, local storage of the telecommunication device 102. An example list of cells 112 is illustrated in greater detail in FIG. 2, in accordance with various embodiments. FIG. 2 illustrates a list of cells 112 that comprises a data structure with multiple entries. Each entry includes a cell identifier 202, a timestamp 204, and a number of visits 206. For example, the entry associated with cell identifier 202 "A" has a timestamp 204 "Jan. 18, 2011, 21:52," and a number of visits 206 "5." The data formats shown in FIG. 2 for cell identifiers 202, timestamps 204, and numbers of visits 206 are provided simply for the sake of illustrations, and any data formats may be used for any of entry fields 202-206. Techniques for building the list of cells 112 by adding entries and updating timestamps 204 and numbers of visits 206 are described above in greater detail.

Returning to FIG. 1, in various embodiments, the cloud service 114 may be implemented in any one or more computing devices, such as PCs, laptop computers, workstations, server systems, mainframes, server farms, or any other computing device. An example device of such a computing device of the cloud service 114 is illustrated in greater detail in FIG. 7 and is described in detail below with reference to that figure. The computing devices of the cloud service 114 may also be connected by one or more networks, such as WANs, LANs, PANs, or the Internet and may utilize any sort of communication protocol known in the art for sending and receiving messages, such as TCP/IP, HTTP, or any other protocol. Also, while the cloud service 114 is shown as being separate from telecommunication network 106, the cloud service 114 could be implemented as a part of the telecommunication network 106.

In some embodiments, the module 116 of the cloud service 114 may receive cell identifiers of cells 104 associated with a specific network type from a plurality of telecommunication devices 102. In some embodiments, these cell identifiers may be provided using lists of cells 112 built by the telecommunication devices 102 and provided to the cloud service 114 on a timed or event-driven basis by the modules 110 of the telecommunication devices 102. The module 116 may also receive a mapping of cell identifiers to geographic locations and, optionally, additional cell identifiers associated with the specific network type from a telecommunication service provider of the telecommunication network 106. Further, in some embodiments, the telecommunication devices 102 may each provide their current locations, either on a timed or an event-drive basis. In one embodiment, the cloud service 114 may learn to predict telecommunication device locations based on receiving location updates from telecommunication devices 102 over a period of time.

In various embodiments, the module 116 may build a list of cells 112 from the cell identifiers. The module 116 may build a master list of cells based on all the cell identifiers and may transmit the master list of cells 112 to telecommunication devices 102, where the master list of cells 112 may serve as the above-mentioned initial list of cells 112 or as a replacement list of cells 112 for a pre-existing list of cells 112. In other embodiments, the module 116 may build a list of cells 112 specifically for one or more telecommunication devices 102 based on current locations of those one or more telecommunication devices 102. For example, if the provided or learned locations indicate three telecommunication devices 102 to be at a same location, the module 116 may use the received cell identifiers and mappings to build a list of cells 112 that includes identifiers of the N nearest cells 104 to the location. The module 116 may then provide this list of cells 112 to the three telecommunication devices 102 to serve as the above-mentioned initial list of cells 112 or as a replacement list of cells 112 for a pre-existing list of cells 112.

Example Operations

Figure 3:
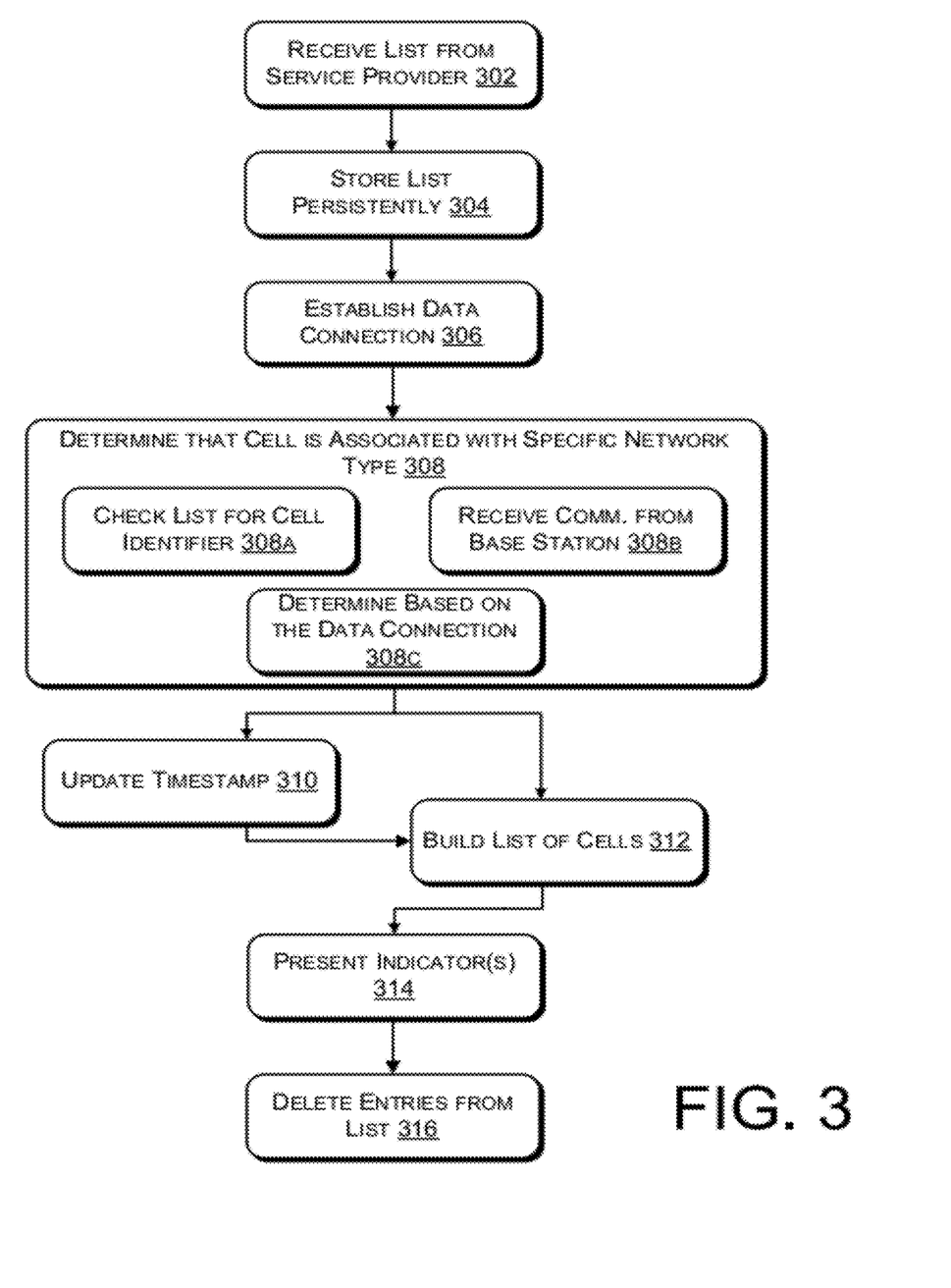
FIG. 3 illustrates a flowchart showing an example method of building a list of cells by a telecommunication device, in accordance with various embodiments.

FIG. 3 illustrates a flowchart showing an example method of building a list of cells by a telecommunication device, in accordance with various embodiments. As shown at block 302, the telecommunication device may receive a list of cells from a telecommunication network service provider. Cells present in the list may be associated with a specific network type. For example, the specific network type may be one of a first generation network, a second generation network, a third generation network, a fourth generation network, a later generation network, a Wi-Fi network, a Wi-Max network, or any other sort of network. Further, the list of cells may include an entry for each cell identifier, each entry including at least one of a timestamp or a number of visits associated with that cell identifier.

At block 304, the telecommunication device may store the list of cells persistently over a plurality of power cycles in local storage of the telecommunication device.

At block 306, the telecommunication device may establish a data connection with a base station of a telecommunication network cell. In some implementations, the telecommunication device may establish a data connection responsive to determining that the telecommunication device has entered a new cell of the telecommunication network.

At block 308, telecommunication device may determine that a cell of the telecommunication network, such as a newly-entered cell, is associated with the specific network type. In one implementation, at block 308a, the telecommunication device may perform the determining based at least in part on checking the list of cells to determine whether the list of cells already includes an identifier of the cell. The cell identifier may be provided to the telecommunication device by the base station of the cell. In another implementation, at block 308b, the determining may include receiving a communication from a base station of the cell specifying one or more network types offered by the base station and determining if the one or more specific network types include the specific network type. In a further implementation, at block 308c, the determining may be based at least in part on information provided during the data connection. For example, the specific network type may be associated with a network that is 64 QAM enabled, is dual-carrier 64 QAM enabled, is multi-carrier, or is 64 QAM enabled with MIMO and the information may indicate that the cell is 64 QAM enabled, is dual-carrier 64 QAM enabled, is multi-carrier, or is 64 QAM enabled with MIMO.

At block 310, if the telecommunication device determines that an identifier of the cell is already listed in the list of cells, the telecommunication device may update a timestamp associated with the identifier.

At block 312, the telecommunication device may build the list of cells by including an identifier of the cell in the list. The building may involve creating a new list of cells and storing it locally on the telecommunication device or updating an existing list, such as the list received at block 302. If the identifier is already included, as mentioned above, the building may involve updating the timestamp associated with the identifier.

At block 314, the telecommunication device may present at least one indicator associated with the specific network type.

At block 316, the telecommunication device may delete entries for cells from the list based on which entries have the oldest timestamps or the fewest numbers of visits. In some implementations, the number of entries deleted is based on a maximum number of entries stored by the telecommunication device.

Figure 4:
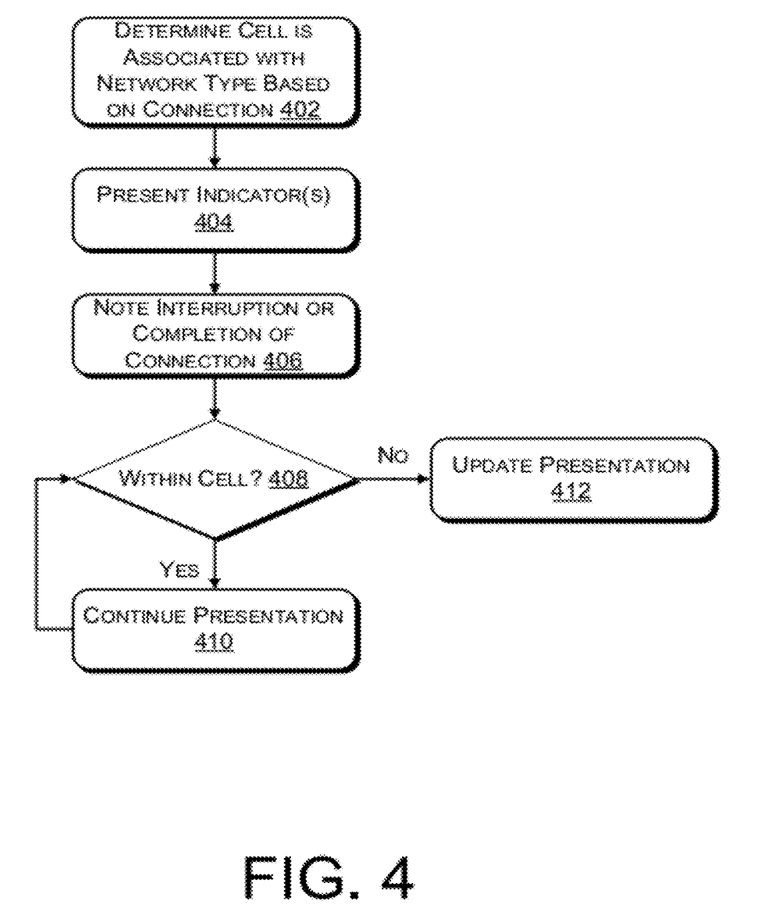
FIG. 4 illustrates a flowchart showing an example method of continuing a presentation of at least one network type indicator despite interruption or completion of a data connection, in accordance with various embodiments.

FIG. 4 illustrates a flowchart showing an example method of continuing a presentation of at least one network type indicator despite interruption or completion of a data connection, in accordance with various embodiments. At block 402, the telecommunication device may determine based on a data connection that a cell of a telecommunication network is associated with a specific network type.

At block 404, the telecommunication device may then present at least one indicator of the specific network type.

At block 406, the telecommunication device may note the interruption or completion of the data connection.

At block 408, the telecommunication device may determine whether the telecommunication device is still within the same cell. If the telecommunication device is still within the same cell, the telecommunication device may, at block 410, continue presentation of the at least one indicator despite the interruption or completion of the data connection. The telecommunication device may then repeat the determining at block 408. If the telecommunication device is no longer within the same cell, the telecommunication device may, at block 412, update presentation of the at least one indicator.

Figure 5:
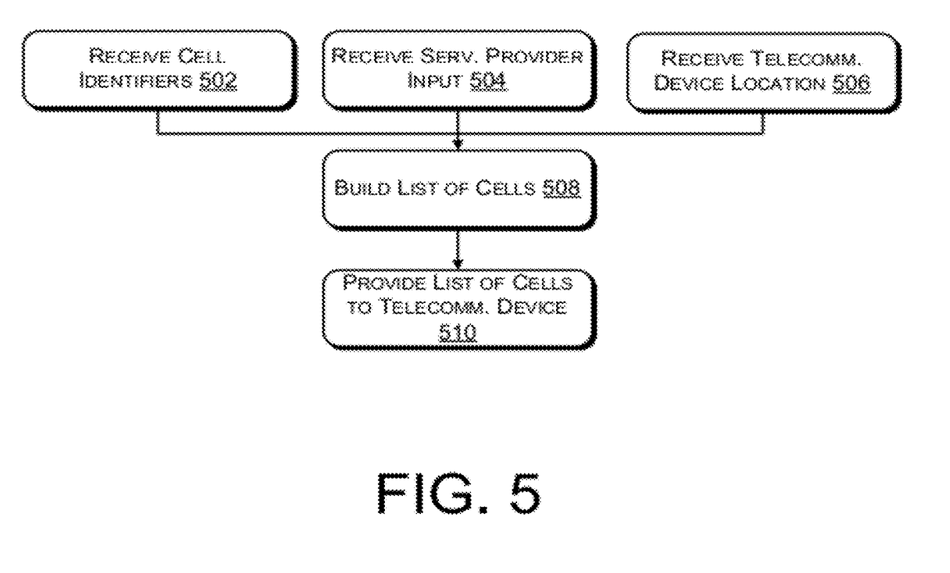
FIG. 5 illustrates a flowchart showing an example method of building a list of cells by a cloud service, in accordance with various embodiments.

FIG. 5 illustrates a flowchart showing an example method of building a list of cells by a cloud service, in accordance with various embodiments. At block 502, a one or more computing devices of a cloud service receive from first one or more telecommunication devices identifications of cells of a telecommunication network that are associated with a specific network type. At block 504, the cloud service receives input from the telecommunication network service provider. At block 506, the cloud service may receive a location of one of the telecommunication devices, such as a GPS location.

At block 508, the cloud service may build a list of cells associated with the specific network type by including the received identifiers in the list. The cloud service may also build the list based on the input received from the telecommunication network service provider. Also, the cloud service may build multiple lists, each specific to a telecommunication device based on the location of that telecommunication device.

At block 510, the cloud service may provide the list(s) to one or more telecommunication devices.

Example Systems

Figure 6:
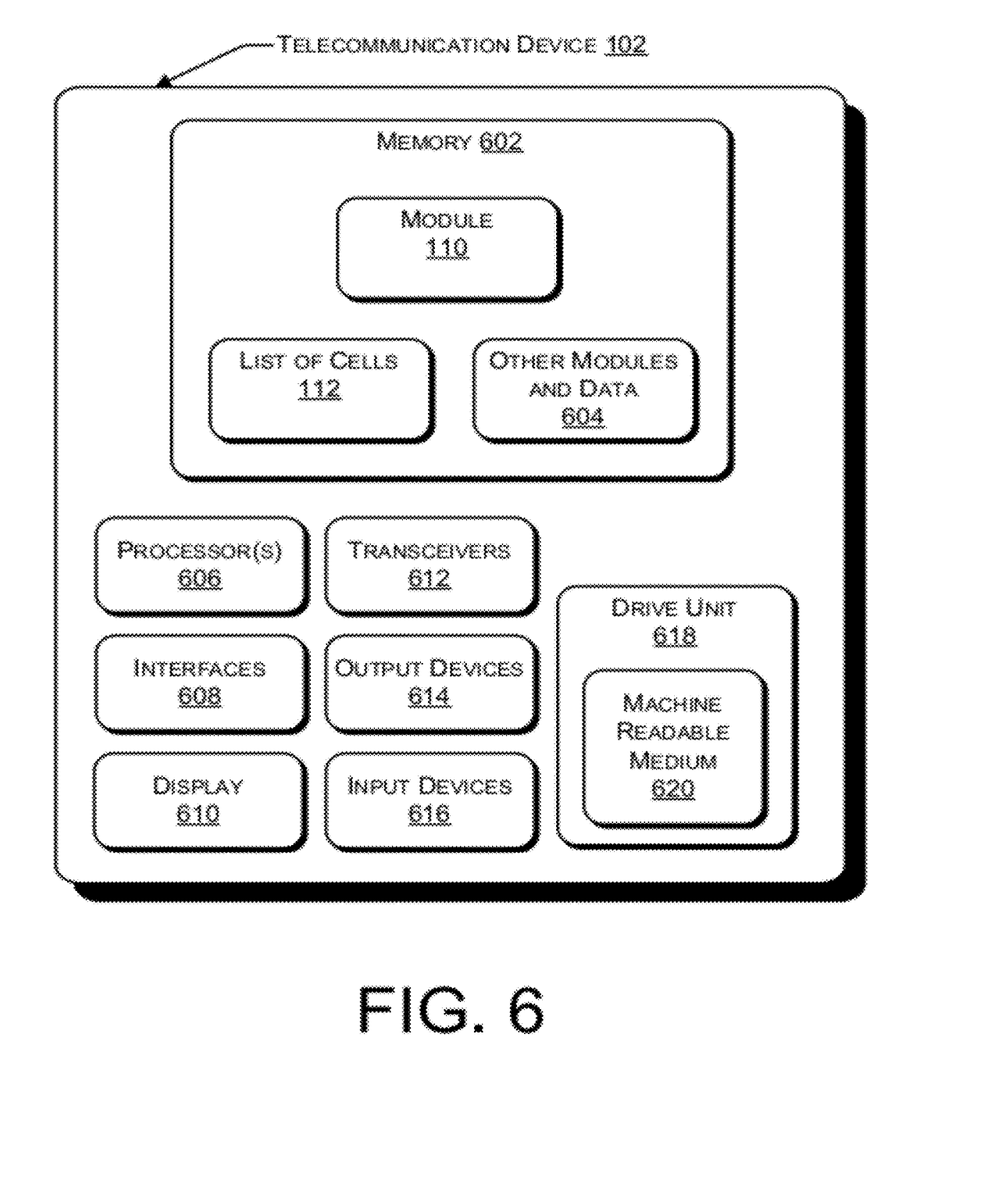
FIG. 6 illustrates an example telecommunication device system architecture, in accordance with various embodiments.

FIG. 6 illustrates an example telecommunication device system architecture, in accordance with various embodiments. As shown, the telecommunication device 102 may include a memory 602, the memory storing the module 110, the list of cells 112, and other modules and data 604. The telecommunication device 102 may also include processor(s) 606, interfaces 608, a display 610, transceivers 612, output devices 614, input devices 616, and drive unit 618 including a machine readable medium 620.

In various embodiments, memory 602 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). Additionally, in some embodiments, memory 602 includes a SIM (subscriber identity module) card, which is a removable memory card used to identify a user of the telecommunication device 102 to a telecommunication network, such as telecommunication network 106. Memory 602 can also be described as computer storage media and may include volatile and nonvolatile, removable and non-removable media implemented in any method or technology for storage of information, such as computer readable instructions, data structures, program modules, or other data.

The module 110 and list of cells 112, shown as stored in memory 602, are described in greater detail above. As previously mentioned, the list 112 may be stored persistently across multiple power cycles. Such persistent storage may be offered by the memory 602. The other modules and data 604 may be utilized by the telecommunication device 102 to perform or enable performing any action taken by the telecommunication device 102. The other modules and data 604 may include a telecommunication device platform and applications, and data utilized by the platform and applications.

In some embodiments, the processor(s) 606 is a central processing unit (CPU), a graphics processing unit (GPU), or both CPU and GPU, or any other sort of processing unit.

In various embodiments, the interfaces 608 are any sort of interfaces. Interfaces 608 include any one or more of a wireless LAN interface, or a near field interface. The a wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. For instance, the telecommunication device 102 can use a Wi-Fi interface to communicate directly with a nearby device. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into telecommunication device 102.

In various embodiments, the display 610 is a liquid crystal display or any other type of display commonly used in telecommunication devices. For example, display 610 may be a touch-sensitive display screen, and can then also act as an input device or keypad, such as for providing a soft-key keyboard, navigation buttons, or the like.

In some embodiments, the transceivers 612 include any sort of transceivers known in the art. For example, transceivers 612 may include a radio transceiver and interface that performs the function of transmitting and receiving radio frequency communications via an antenna. The radio interface facilitates wireless connectivity between the telecommunication device 102 and various cell towers, base stations and/or access points, such as base stations 108 of cells 104.

In some embodiments, the output devices 614 include any sort of output devices known in the art, such as a display (already described as display 610), speakers, a vibrating mechanism, or a tactile feedback mechanism. Output devices 614 also include ports for one or more peripheral devices, such as headphones, peripheral speakers, or a peripheral display.

In various embodiments, input devices 616 include any sort of input devices known in the art. For example, input devices 616 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 620 stores one or more sets of instructions (e.g., software) embodying any one or more of the methodologies or functions described herein. The instructions may also reside, completely or at least partially, within the memory 602 and within the processor(s) 606 during execution thereof by the telecommunication device 102. The memory 602 and the processor(s) 606 also may constitute machine readable media 620.

Figure 7:
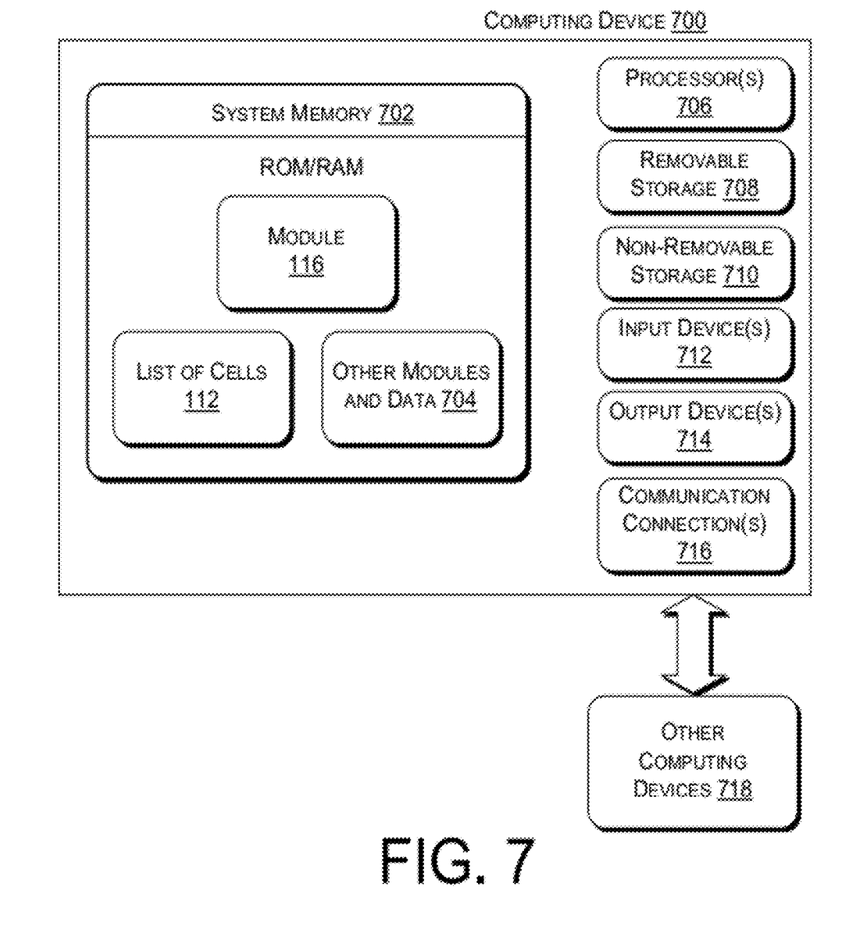
FIG. 7 illustrates an example computing device of a cloud service or a cell base station, in accordance with various embodiments.

FIG. 7 illustrates an example computing device of a cloud service or a cell base station, in accordance with various embodiments. As illustrated, the computing device 700 comprises a system memory 702. If computing device 700 belongs to the cloud service 114, the system memory 702 may store the module 116, a list of cells 112, and other modules and data 704. Also, the computing device 700 includes processor(s) 706, a removable storage 708 and non-removable storage 710, input device(s) 712, output device(s) 714, and communication connections 716 for communicating with other computing devices 718.

In various embodiments, system memory 702 is volatile (such as RAM), non-volatile (such as ROM, flash memory, etc.) or some combination of the two. Example system memory 702 may include one or more of RAM, ROM, EEPROM, a Flash Memory, a miniature hard drive, a memory card, an optical storage, a magnetic cassettes, a magnetic tape, a magnetic disk storage or another magnetic storage devices, or any other medium.

The module 116 and list of cells 112, shown as stored in memory 602, are described in greater detail above. While both the module 116 and list of cells 112 are shown in FIG. 7 as being stored on a single computing device 700, they may be stored across multiple computing devices 700 of the cloud service 114, each computing device 700 implementing one of the module 116 and list of cells 112, both of the module 116 and list of cells 112, or parts of one or both of the module 116 and list of cells 112. The other modules and data 704 may be utilized by the computing device 700 to perform or enable performing any action taken by the cloud service 114. The other modules and data 704 may include a platform and applications, and data utilized by the platform and applications. In other implementations, where the computing device 700 is associated with a base station 108, the system memory 702 may store modules and data 704, which may store one or more network types associated with the base station and logic configured to communicate those one or more network types.

In some embodiments, the processor(s) 706 is a central processing unit (CPU), a graphics processing unit (GPU), or both CPU and GPU, or other processing unit or component known in the art.

Computing device 700 also includes additional data storage devices (removable and/or non-removable) such as, for example, magnetic disks, optical disks, or tape. Such additional storage is illustrated in FIG. 7 by removable storage 708 and non-removable storage 710. Computer storage media may include volatile and nonvolatile, removable and non-removable media implemented in any method or technology for storage of information, such as computer readable instructions, data structures, program modules, or other data. System memory 702, removable storage 708 and non-removable storage 710 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer-readable storage media may be part of computing device 700.

In various embodiment, any or all of system memory 702, removable storage 708, and non-removable storage 710, store programming instructions which, when executed, implement some or all of the above-described operations of the cloud service 114 or of a base station 108.

Computing device 700 also has input device(s) 712, such as a keyboard, a mouse, a touch-sensitive display, voice input device, etc., and output device(s) 714 such as a display, speakers, a printer, etc. These devices are well known in the art and need not be discussed at length here.

Computing device 700 also contains communication connections 716 that allow the computing device 700 to communicate with other computing devices 718, such as other computing devices 700 of the cloud service 114 or telecommunication devices within a cell 104 of the base station 108.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A telecommunication device comprising:
one or more processors;
local memory storing computer-executable instructions that, when executed by the one or more processors, are configured to cause the telecommunication device to perform operations comprising:
maintaining, in the local memory by the telecommunication device, a list of cells that offer a specific network type, the list of cells having entries that each include a different cell identifier and a number of visits by the telecommunication device to an associated cell;
receiving, by the telecommunication device from a base station of a cell of a telecommunication network, a cell identifier and an indication of a network type offered by the base station;
determining, by the telecommunication device, whether the network type matches the specific network type associated with the list of cells and whether the list of cells already has an entry for the cell identifier;
in response to determining whether the network type matches the specific network type and whether the list of cells already has an entry for the cell identifier, adding, by the telecommunication device, a new entry to the list of cells in the local memory that includes the cell identifier if the network type does match the specific network type and the list of cells does not already have an entry for the cell identifier, and refraining, by the telecommunication device, from adding the new entry to the list of cells if the network type does not match the specific network type or if the list of cells already has the entry for the cell identifier; and
deleting, by the telecommunication device, one or more entries from the list of cells based at least in part on which entries have one or more smallest numbers of visits.

2. The telecommunication device of claim 1, wherein the specific network type is one of a first generation network, a second generation network, a third generation network, a fourth generation network, a later generation network, a Wi-Fi network, or a Wi-Max network.

3. The telecommunication device of claim 1, wherein the operations further comprise:

initiating, by the telecommunication device, a data connection with the base station using the specific network type;

presenting, on a display screen of the telecommunication device, at least one indicator identifying the specific network type;

noting, by the telecommunication device, an interruption of the data connection; and continuing, by the telecommunication device, the presentation on the display screen of the at least one indicator during the interruption of the data connection while the telecommunication device remains within the cell.

4. The telecommunication device of claim 1, wherein the operations further comprise:

in response to determining that the network type matches the specific network type and that the list of cells already includes the entry for the cell identifier, updating an associated number of visits in the list of cells.

5. The telecommunication device of claim 4, wherein the operations further comprise, in response to determining that the network type matches the specific network type and that the list of cells already includes the entry for the cell identifier, updating a timestamp associated with the cell identifier in the list of cells.

6. The telecommunication device of claim 1, wherein the indication of the network type offered by the base station is an explicit identification of the network type in a message header or message body.

7. The telecommunication device of claim 1, wherein the indication of the network type offered by the base station is information from which the telecommunication device can infer the network type.

8. The telecommunication device of claim 7, wherein the information identifies whether the cell is 64 QAM enabled, is dual-carrier 64 QAM enabled, is multi-carrier, or is 64 QAM enabled with multiple-input and multiple-output (MIMO).

9. The telecommunication device of claim 1, wherein the operations further comprise establishing, by the telecommunication device, a data connection with the base station responsive to determining that the network type matches the specific network type.

10. The telecommunication device of claim 1, wherein the operations further comprise initially receiving, by the telecommunication device, the list of cells from a telecommunication network service provider and storing the list of cells in the local memory of the telecommunication device prior to receiving the cell identifier and the indication of the network type offered by the base station from the base station.

11. The telecommunication device of claim 1, wherein the operations further comprise maintaining and storing the list of cells in the local memory by the telecommunication device persistently over a plurality of power cycles.

12. The telecommunication device of claim 1, wherein each entry in the list of cells further includes a timestamp identifying a time at which the telecommunication device was most recently visited the cell associated with the entry.

13. The telecommunication device of claim 12, wherein deleting the one or more entries from the list of cells is further based at least in part on which entries have one or more oldest timestamps.

14. The telecommunication device of claim 1, wherein a number of entries deleted is based on a maximum number of entries stored by the telecommunication device.

15. One or more non-transitory computer-readable media storing computer-executable instructions that, when executed by one or more processors of one or more computing devices of a cloud service, cause the one or more computing devices to perform operations including:

receiving, from one or more mobile telecommunication devices, cell identifiers of cells of a telecommunication network that have base stations which offer a specific network type associated with licensed spectrum;

building a master list of cells associated with the specific network type by adding the cell identifiers received from the one or more mobile telecommunication devices to the master list of cells, wherein the master list of cells includes an entry for each cell identifier and indicates a number of visits to each of the cells associated with the cell identifiers by the one or more mobile telecommunication devices;

receiving location information from a particular mobile telecommunication device indicating a current geographic location of the particular mobile telecommunication device;

building a local list of cells from the master list of cells by including entries from the master list of cells that are associated with cells near the current geographic location of the particular mobile telecommunication device; and providing the local list of cells to the particular mobile telecommunication device.

16. The one or more non-transitory computer-readable media of claim 15, wherein the master list of cells is built at least partially based on input from a telecommunication network service provider.

17. A method comprising:

receiving, by a telecommunication device from a base station of a cell of a telecommunication network, an indication of a network type offered by the base station;

initiating, by the telecommunication device, a data connection with the base station using the network type;

presenting on a display screen of the telecommunication device, by the telecommunication device, at least one indicator identifying the network type;

noting, by the telecommunication device, an interruption of the data connection;

determining, by the telecommunication device, that the telecommunication device is within the cell during the interruption of the data connection;

in response to determining that the telecommunication device is within the cell during the interruption of the data connection, continuing, by the telecommunication device, the presentation on the display screen of the at least one indicator during the interruption of the data connection while the telecommunication device remains within the cell; and adding, by the telecommunication device, a cell identifier of the cell to a list of cells in local memory that offer the network type in response to receiving the indication of the network type offered by the base station.

18. The method of claim 17, further comprising updating the presentation of the at least one indicator when the telecommunication device leaves the cell.

19. The method of claim 17, wherein the indication of the network type offered by the base station is received by the telecommunication device in a message header, extended message header, or message body received from the base station.

* * * * *